US012761850B2

(12) United States Patent
Peterson et al.

(10) Patent No.: US 12,761,850 B2
(45) Date of Patent: Oct. 13, 2026

(54) DEVICE AND METHOD FOR ENHANCING NATURAL VISION IN NEAR-TO-EYE DISPLAYS WITH PAN AND TILT FUNCTIONS

(71) Applicant: Gentex Corporation, Zeeland, MI (US)

(72) Inventors: Christopher A. Peterson, Zeeland, MI (US); Sonali Agrawal, Byron Center, MI (US); Thomas E. Olson, Holland, MI (US); Alexander S. Hull, Kentwood, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 19/198,258

(22) Filed: May 5, 2025

(65) Prior Publication Data

US 2025/0348261 A1 Nov. 13, 2025

Related U.S. Application Data

(60) Provisional application No. 63/643,503, filed on May 7, 2024.

(51) Int. Cl.

| | |
|---|---|
| ***G06F 3/14*** | (2006.01) |
| ***G02B 27/01*** | (2006.01) |
| ***G06V 20/60*** | (2022.01) |

(52) U.S. Cl.

CPC ............ *G06F 3/14* (2013.01); *G02B 27/017* (2013.01); *G06V 20/60* (2022.01)

(58) Field of Classification Search

CPC .......... G06F 3/14; G02B 27/017; G06V 20/60

See application file for complete search history.

(56) References Cited

U.S. PATENT DOCUMENTS

| | | | | |
|---|---|---|---|---|
| 6,731,326 | B1 * | 5/2004 | Bettinardi | H04N 1/19594 382/114 |
| 10,129,520 | B2 * | 11/2018 | Munger | H04N 13/117 |
| 10,546,430 | B1 * | 1/2020 | Lu | G06F 3/016 |
| 2017/0017080 | A1 * | 1/2017 | Onwuta | G06F 3/013 |
| 2018/0332219 | A1 * | 11/2018 | Corcoran | G02B 27/017 |
| 2021/0132418 | A1 * | 5/2021 | Muramatsu | G06F 3/0416 |
| 2022/0308674 | A1 * | 9/2022 | Nicholson | G02B 27/0172 |
| 2023/0129308 | A1 * | 4/2023 | Quirynen | H04N 23/661 345/8 |
| 2023/0185365 | A1 * | 6/2023 | Rahman | G02B 27/0093 345/156 |

(Continued)

*Primary Examiner* — Cory A Almeida

(74) *Attorney, Agent, or Firm* — Price Heneveld LLP; Brian James Brewer

(57) ABSTRACT

A near-to-eye display device is provided that includes a camera for capturing images in a first field of view; at least one display positioned near to an eye of a person wearing the device for displaying images captured by the camera in a second field of view, wherein the second field of view is smaller than the first field of view; and a controller for selecting a portion of the images from the camera to display on the display. The controller being configured to automatically enter a reading mode upon detecting one of a downward tilt of the device and reading material within the images. In a reading mode, the controller selects a lower portion of the images to display on the display. When not in a non-reading mode, the controller selects a higher portion of the images to display on the at least one display.

13 Claims, 4 Drawing Sheets

(56) References Cited

U.S. PATENT DOCUMENTS

| | | | | |
|---|---|---|---|---|
| 2023/0360290 | A1 * | 11/2023 | Keller ................ | G02B 27/0172 |
| 2024/0027617 | A1 * | 1/2024 | Kawamae ....... | H04M 1/724097 |
| 2024/0320927 | A1 * | 9/2024 | Cartwright ............. | G06F 3/012 |

* cited by examiner

DEVICE AND METHOD FOR ENHANCING NATURAL VISION IN NEAR-TO-EYE DISPLAYS WITH PAN AND TILT FUNCTIONS

CROSS-REFERENCE TO RELATED APPLICATION

This application claims priority to and the benefit under 35 U.S.C. § 119(e) of U.S. Provisional Patent Application No. 63/643,503, filed on May 7, 2024, entitled "DEVICE AND METHOD FOR ENHANCING NATURAL VISION IN NEAR-TO-EYE DISPLAYS WITH PAN AND TILT FUNCTIONS," by Christopher A. Peterson et al., the entire disclosure of which is incorporated herein by reference.

TECHNOLOGICAL FIELD

The present invention relates to near-to-eye displays and, more particularly, relates to near-to-eye displays providing enhanced natural vision.

SUMMARY OF THE INVENTION

According to one aspect of the invention, a near-to-eye display device comprises: a camera for capturing images in a first field of view; at least one display positioned near to an eye of a person wearing the device for displaying images captured by the camera in a second field of view, wherein the second field of view is smaller than the first field of view; and a controller in communication with the camera and the at least one display for selecting a portion of the images from the camera to display on the at least one display, the controller being configured to automatically enter a reading mode upon detecting one of a downward tilt of the device and reading material within the images captured by the camera, in a reading mode, the controller selects a lower portion of the images to display on the at least one display, and when in a non-reading mode, the controller selects a higher portion of the images to display on the at least one display.

According to another one of the various aspects of the present disclosure, a near-to-eye display device is provided comprising: a camera for capturing images in a first field of view forward of a person wearing the device; at least one display positioned near to an eye of the person wearing the device for displaying images captured by the camera in a second field of view, wherein the second field of view is smaller than the first field of view; and a controller in communication with the camera and the at least one display for selecting a portion of the images from the camera to display on the at least one display, the controller being configured to automatically enter one of a plurality of display modes upon image analysis of the images captured by the camera, wherein in each display mode, the controller selects different regions of interest from the images to display on the at least one display.

According to another one of the various aspects of the present disclosure, a near-to-eye display device is provided comprising: a camera for capturing images in a first field of view; at least one display positioned near to an eye of a person wearing the device for displaying images captured by the camera in a second field of view, wherein the second field of view is smaller than the first field of view; an inertial sensor for sensing at least one of tilt, pan, and rotation of the device; and a controller in communication with the inertial sensor, the camera, and the at least one display for selecting a portion of the images from the camera to display on the at least one display, the controller being configured to automatically enter one of a plurality of display modes in response to output from the inertial sensor, wherein in each display mode, the controller selects different regions of interest from the images to display on the at least one display.

These and other features, advantages, and objects of the present device will be further understood and appreciated by those skilled in the art upon studying the following specification, claims, and appended drawings.

BRIEF DESCRIPTION OF THE DRAWINGS

The embodiments will now be described with reference to the following drawings, in which.

The components in the figures are not necessarily to scale, emphasis instead being placed upon illustrating the principles described herein.

DETAILED DESCRIPTION OF EMBODIMENTS

Figure 1:
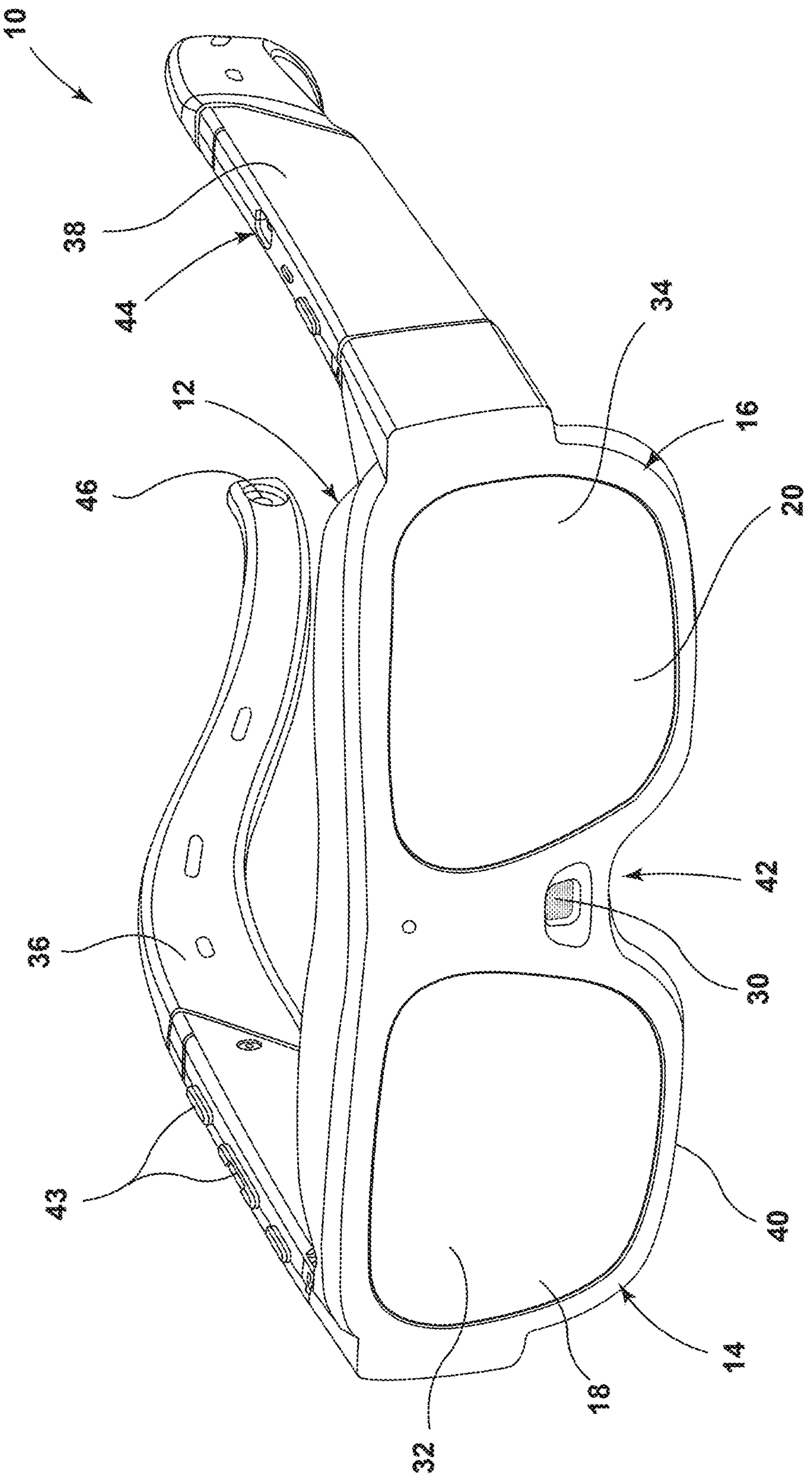
FIG. 1 is a perspective view of a near-to-eye display device according to the present disclosure.

For purposes of description herein, the terms "upper," "lower," "right," "left," "rear," "front," "vertical," "horizontal," and derivatives thereof shall relate to the near-to-eye display device as oriented in FIG. 1. Unless stated otherwise, the term "front" shall refer to the surface of the element closer to an intended viewer of the device, and the term "rear" shall refer to the surface of the element further from the intended viewer of the device. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As defined herein, "approximately" and "about," when used in reference to angles, proportions, and the like, may, in some embodiments, mean within plus or minus ten percent of the stated value. In other embodiments, "approximately" and "about," when used in reference to angles, proportions, and the like, may mean within plus or minus five percent of the stated value. In further embodiments, "approximately" and "about," when used in reference to angles, proportions, and the like, may mean within plus or minus three percent of the stated value. In yet other embodiments, "approximately" and "about," when used with reference to angles, proportions, and the like, may mean within plus or minus one percent of the stated value.

Near-to-eye display devices are known in the art that include a camera for capturing images forward of the device, as well as a pair of displays that are positioned near the wearer's eyes for displaying images captured by the camera. Such near-to-eye display devices can help people with significant central vision loss and legal blindness achieve up to 20/20 enhanced vision. One such near-to-eye display device is disclosed in commonly-assigned U.S. Pat. No. 10,129,520, the entire disclosure of which is incorporated herein by reference. The disclosed device changes a region of interest within the camera's field of view that is displayed on the displays based upon detecting the direction of the user's gaze. Although the disclosed device provides significant improvements, there exists a desire to make near-to-eye display devices as practical as possible while providing displayed images in the most natural way possible while still providing automated section of a region of interest to display.

Figure 2:
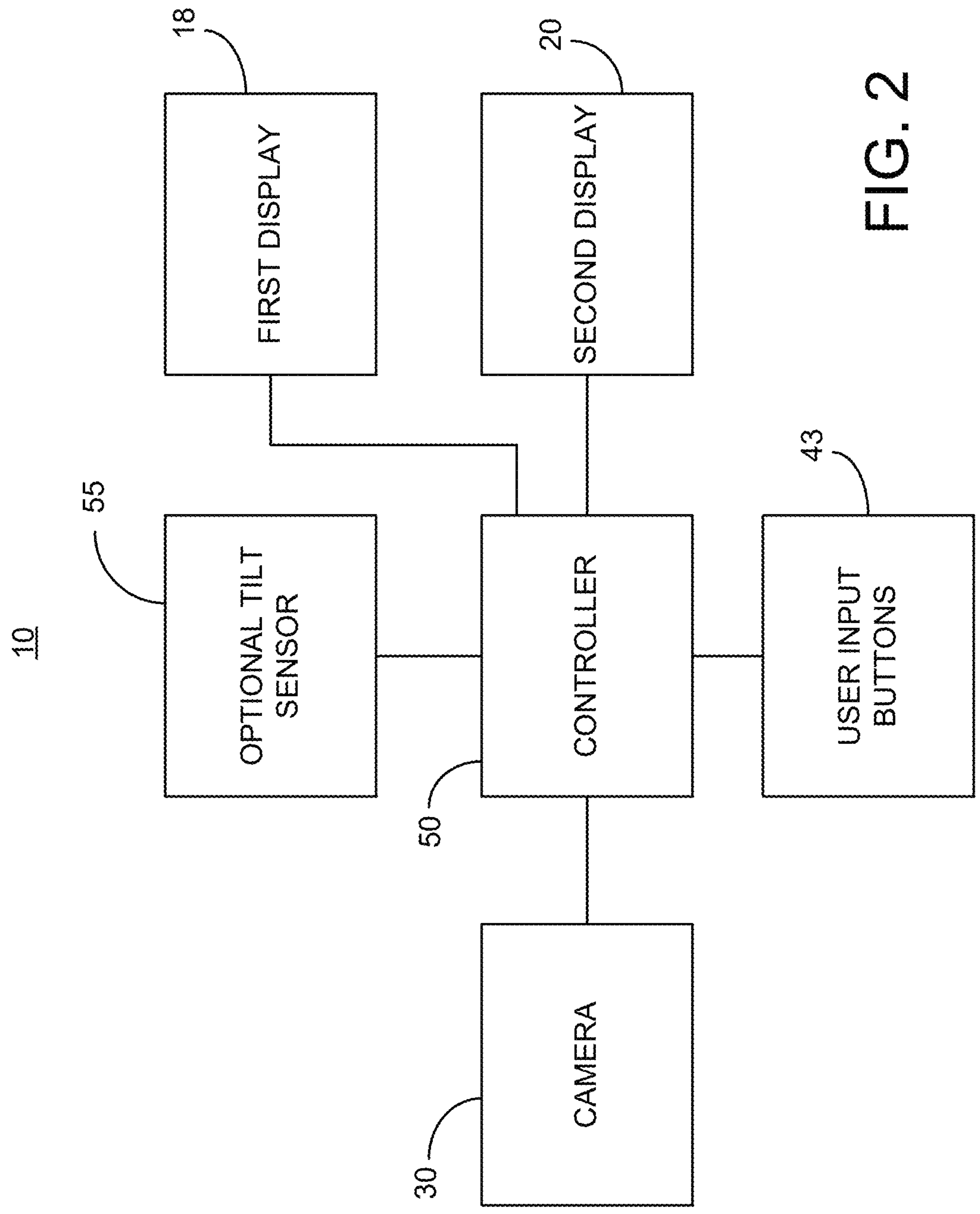
FIG. 2 is an electrical circuit diagram in block form of the electrical components of the near-to-eye display device shown in FIG. 1.

FIGS. 1 and 2 illustrate a near-to-eye display device 10 according to the present disclosure. The device 10 may include a frame housing 12 that may be worn by a person and which supports a camera 30, and at least one display 18, 20. The device 10 may further include a controller 50 that may or may not be supported on the frame housing 12. The controller 50 is in communication with the camera 30 and the at least one display 18, 20 for selecting a portion of the images from the camera 30 to display on the at least one display 18, 20. The controller 50 being configured to automatically enter a reading mode upon detecting one of a downward tilt of the device 10 and reading material within the images captured by the camera 30 or both. In a reading mode, the controller 50 selects a lower portion of the images to display on the at least one display 18, 20. When not in a non-reading mode, the controller 50 selects a higher portion of the images to display on the at least one display 18, 20.

As best shown in FIG. 1, the frame housing 12 defines a first lens position 14 and a second lens position 16 spaced to be aligned with different ones of the user's eyes, respectively. A first display 18 corresponds to the first lens position 14, and the first display 18 is configured to present a first image for viewing by one of the user's eyes. A second display 20 corresponds to the second lens position 16, and the second display 20 is configured to present a second image for viewing by the other of the user's eyes.

The frame housing 12 may include a first lens 32 covering the first lens position 14 and first display 18 and a second lens 34 covering the second lens position 16 and the second display 20. A first temple bridge 36 extends from a location proximate the first lens position 14 and is configured to extend over a user's first ear and a second temple bridge 38 extends from a location proximate the second lens position 16 and is configured to extend over a user's second ear. A bottom edge 40 of the frame housing 12 defines a central recess 42 for resting on a user's nose. The frame housing 12 may include buttons 43 for operating the various electronic components in the device 10 and a charging port 44 for charging a battery (not shown) and/or otherwise power the electronic components in the device 10. In some embodiments, a speaker 46 is located, for example, on distal ends of each of the temple bridges 36, 38.

With continued reference to FIG. 1, the camera 30 may be located between the first lens position 14 and the second lens position 16. The camera 30 may be configured to capture the first and second images generated on the first display 18 and the second display 20. Further, the first display 18 and the second display 20 may display images other than the images captured by the camera 30. In some embodiments, the first display 18 and the second display 20 may be configured to merge images captured by the camera and images produced by the controller 50 to present semi-virtual or hybrid images. The images produced by the controller 50 may be stored in a non-transitory memory (not shown) and include a storage management module that manages one or more partitions within the memory. In some embodiments, the memory may include flash memory, semiconductor (solid state) memory or the like. The memory may include Random Access Memory (RAM), a Read-Only Memory (ROM), or a combination thereof. The memory may include instructions that, when executed by the controller 50, cause the controller 50 to, at least, perform the functions and method steps as described herein.

The controller 50 may be any device operable to analyze image data from the camera 30. For example, controller 50 may be one or more processors, a multicore processor, or any combination of processors, circuits, and peripheral processing devices. Additionally, controller 50 may comprise a non-transitory memory operable to store a pixel analysis algorithm. Further, controller 50 may be operable to adjust a brightness, transmittance, or other display characteristic of displays 18 and 20. Accordingly, controller 50 is communicatively connected to the camera 30 and the displays 18 and 20. The controller 50 may also be communicatively connected to the user input buttons 43 for processing any inputs received.

The displays 18 and 20 may be any digital screen, such as, a light emitting diode (LED) display, organic LED display (OLED), liquid crystal display (LCD), etc. The displays 18 and 20 may be operable to display a portion of the field of view of the camera 30. For example, the displays 30*a* and 30*b* may be configured to display portions of images captured by camera 30 such that a user may view varying fields of view suited for the particular activity of the user.

As noted above, the controller 50 is configured to select a portion of the images from the camera 30 to display on the at least one display 18, 20. The controller 50 being configured to automatically enter a reading mode upon detecting one of a downward tilt of the device 10 and reading material within the images captured by the camera 30 or both. The controller 50 may detect downward tilt through image processing of the images captured by the camera and/or may use an optional tilt sensor 55 (FIG. 2).

Figure 3:
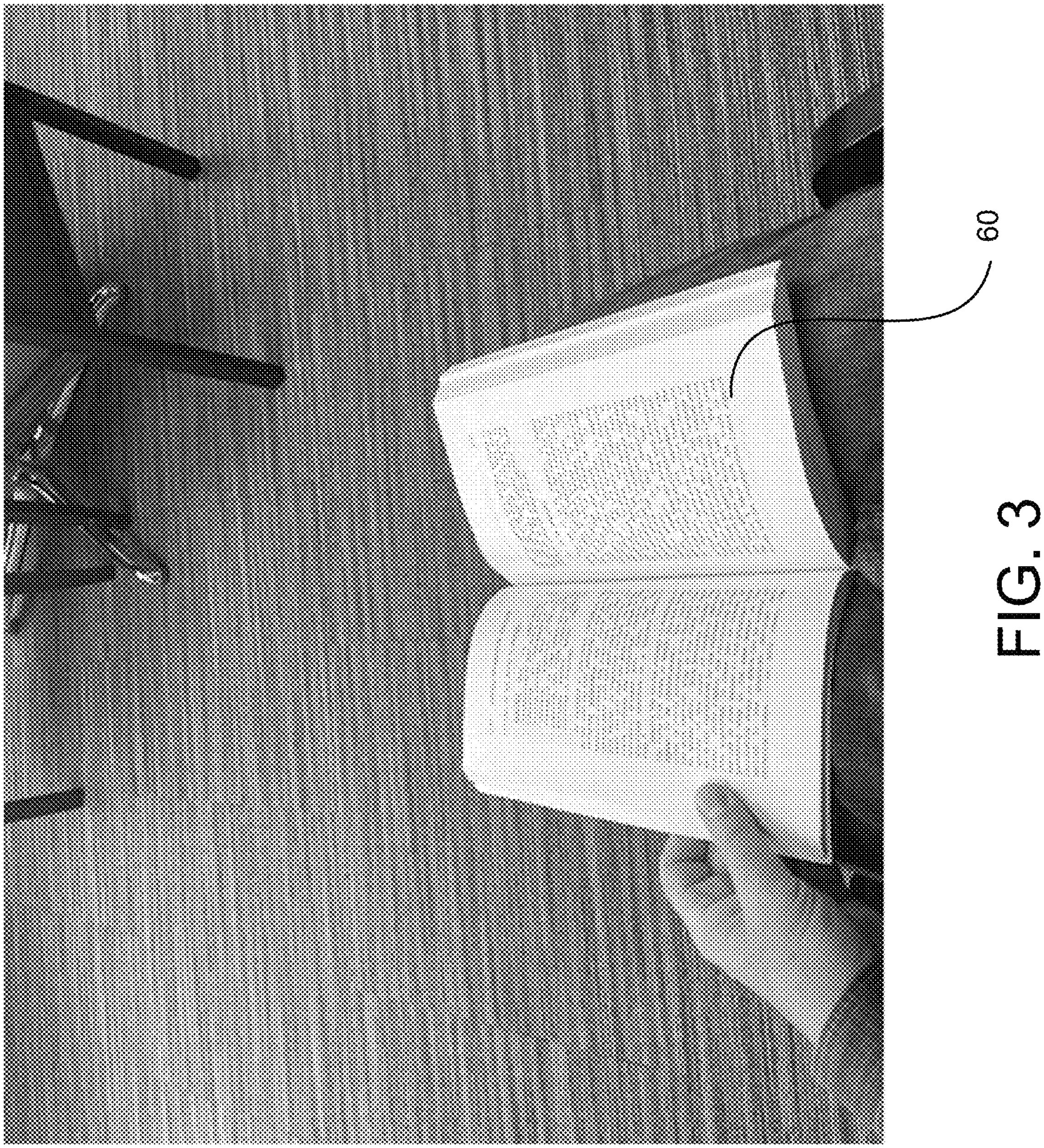
FIG. 3 is an example image captured by the camera of the near-to-eye display device of FIG. 1.
Figure 4:
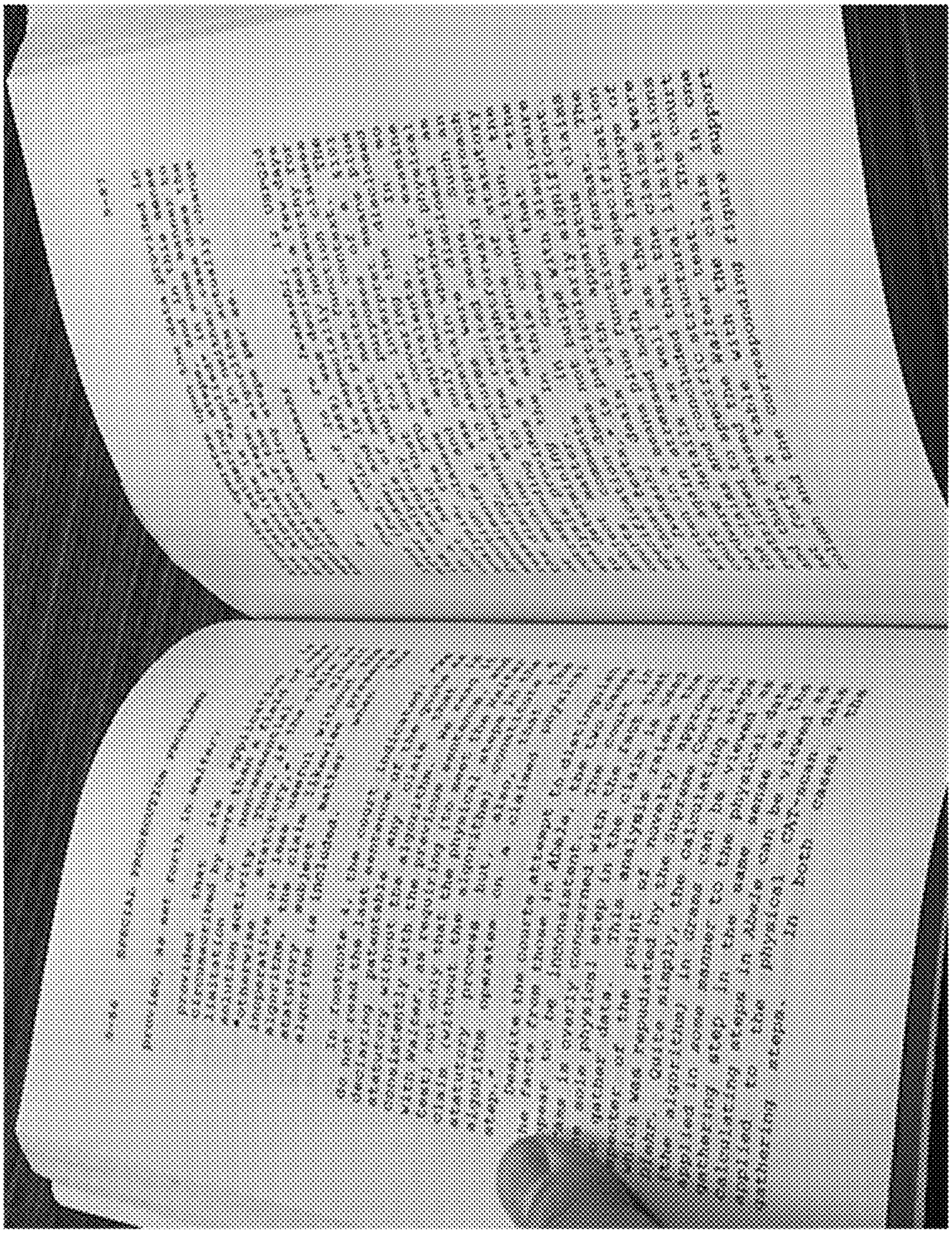
FIG. 4 is an example image as displayed by the near-to-eye display device of FIG. 1.

FIG. 3 shows a first example of an image that may be captured by the camera 30. In the first example, reading material 60 is present and would be detectable with image analysis performed by the controller 50. Alternatively, if a tilt sensor 55 were present, it would sense that the device 10 is sufficiently tilted downward to change the field of view. In either case, the controller 50 may enter a reading mode and thus select a portion of the images from the camera 30 to display on the at least one display 18, 20 as shown in the second example in FIG. 4. Reading material may include any object including text, such as a book, a magazine, a newspaper, mail, a computer tablet, a computer monitor, etc.

If the controller 50 were to subsequently detect that the device 10 is no longer titled or if the controller 50 detects that reading material 60 were no longer present, the controller 50 may exit the reading mode and display a wider field of view consistent with a non-reading mode. The reading mode may be automatically enabled or disabled after a predetermined duration following an event. For example, the reading mode may be automatically enabled when looking at reading material/object for a given time duration such as 5-10 seconds, for example, and disabled when the reading material/object goes out of view for more than 5-10 seconds.

The tilt sensor 55 may be any type of sensor capable of detecting tilt. Examples of suitable sensors include an accelerometer, gyroscope, or dedicated inclinometer. Such sensors may be a 6-axis inertial sensor (accelerometer and gyroscope) that are capable of detecting more than just a tilt angle. For example, the inertial sensor may detect tilt, pan, and rotation so that the controller 50 may enter other display modes and change the displayed field of view accordingly.

Although the above description mentions a reading mode and a non-reading mode, other modes may be entered or exited that cause the controller 50 to select different regions of interest. For example, through image analysis performed by the controller 50 on images captured using the camera 30, the controller 50 may detect that the user is watching a TV/movie and automatically enter a TV/movie mode that causes the TV/movie screen to fill the displays 18 and 20 while performing image stabilization such that the displayed images are more stabilized. In other words, the controller 50 is configured to select a region of interest to display corresponding to the size of the TV/movie screen when in the TV/movie mode. Another example would be a sport mode for either live or broadcast sporting events. Here, through image analysis performed by the controller 50 on images captured using the camera 30, the controller 50 may detect that the user is watching a sporting event and may automatically track a ball or puck. Other objects could also be tracked in images captured by the camera 30.

A mode option may be quickly entered and/or exited through pressing either a remote or temple arm button 43.

According to one of the various aspects of the present disclosure, a near-to-eye display device is provided comprising: a camera for capturing images in a first field of view; at least one display positioned near to an eye of a person wearing the device for displaying images captured by the camera in a second field of view, wherein the second field of view is smaller than the first field of view; and a controller in communication with the camera and the at least one display for selecting a portion of the images from the camera to display on the at least one display, the controller being configured to automatically enter a reading mode upon detecting one of a downward tilt of the device and reading material within the images captured by the camera, in a reading mode, the controller selects a lower portion of the images to display on the at least one display, and when in a non-reading mode, the controller selects a higher portion of the images to display on the at least one display.

According to various aspects, the disclosure may implement one or more of the following features or configurations in various combinations: wherein the controller selects a narrower field of view in the reading mode and a wider field of view in the non-reading mode.

According to another one of the various aspects of the present disclosure, a near-to-eye display device is provided comprising: a camera for capturing images in a first field of view forward of a person wearing the device; at least one display positioned near to an eye of the person wearing the device for displaying images captured by the camera in a second field of view, wherein the second field of view is smaller than the first field of view; and a controller in communication with the camera and the at least one display for selecting a portion of the images from the camera to display on the at least one display, the controller being configured to automatically enter one of a plurality of display modes upon image analysis of the images captured by the camera, wherein in each display mode, the controller selects different regions of interest from the images to display on the at least one display.

According to another one of the various aspects of the present disclosure, a near-to-eye display device is provided comprising: a camera for capturing images in a first field of view; at least one display positioned near to an eye of a person wearing the device for displaying images captured by the camera in a second field of view, wherein the second field of view is smaller than the first field of view; an inertial sensor for sensing at least one of tilt, pan, and rotation of the device; and a controller in communication with the inertial sensor, the camera, and the at least one display for selecting a portion of the images from the camera to display on the at least one display, the controller being configured to automatically enter one of a plurality of display modes in response to output from the inertial sensor, wherein in each display mode, the controller selects different regions of interest from the images to display on the at least one display.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A near-to-eye display device comprising:

a camera for capturing images in a first field of view;

at least one display positioned near to an eye of a person wearing the device for displaying images captured by the camera in a second field of view, wherein the second field of view is smaller than the first field of view; and a controller in communication with the camera and the at least one display for selecting a portion of the images from the camera to display on the at least one display, the controller being configured to automatically enter a reading mode upon detecting one of a downward tilt of the device and reading material within the images captured by the camera, in a reading mode, the controller selects a lower portion of the images to display on the at least one display, and when in a non-reading mode, the controller selects a higher portion of the images to display on the at least one display.

2. The near-to-eye display device of claim 1, wherein the controller selects a narrower field of view in the reading mode and a wider field of view in the non-reading mode.

3. The near-to-eye display device of claim 1 and further including a sensor for sensing at least a downward tilt to which the controller responds by entering a reading mode.

4. The near-to-eye display device of claim 3, wherein the sensor further senses pan and rotation of the device, wherein the controller responds to the detection of pan or rotation by entering another mode of operation.

5. The near-to-eye display device of claim 3, wherein the sensor is an inertial sensor.

6. The near-to-eye display device of claim 3, wherein the sensor is a six-axis inertial sensor.

7. A near-to-eye display device comprising:

a camera for capturing images in a first field of view forward of a person wearing the device;

at least one display positioned near to an eye of the person wearing the device for displaying images captured by the camera in a second field of view, wherein the second field of view is smaller than the first field of view; and a controller in communication with the camera and the at least one display for selecting a portion of the images from the camera to display on the at least one display, the controller being configured to automatically enter one of a plurality of display modes upon image analysis of the images captured by the camera, wherein in each display mode, the controller selects different regions of interest from the images to display on the at least one display, wherein the controller is configured to automatically enter a reading mode upon detecting reading material within the images captured by the camera.

8. The near-to-eye display device of claim 7, wherein the controller selects a narrower field of view in the reading mode and a wider field of view in a non-reading mode.

9. The near-to-eye display device of claim 7, wherein the controller is configured to automatically enter a TV/movie mode upon detecting that a user is watching a TV or a movie screen by analyzing the images captured by the camera.

10. The near-to-eye display device of claim 9, wherein the controller is configured to select a region of interest to display corresponding to the size of the TV/movie screen when in the TV/movie mode.

11. The near-to-eye display device of claim 9, wherein the controller is configured to perform image stabilization when in the TV/movie mode.

12. The near-to-eye display device of claim 7, wherein the controller is configured to automatically enter a sport mode upon detecting that a user is watching a sporting event.

13. The near-to-eye display device of claim 12, wherein the controller is configured to track a ball or puck in the images and to select a region of interest to display corresponding to the ball or puck when in the sport mode.

* * * * *